US006902191B2

(12) United States Patent
Angel

(10) Patent No.: US 6,902,191 B2
(45) Date of Patent: Jun. 7, 2005

(54) TILT SETTING DEVICE FOR A STEERING COLUMN

(75) Inventor: Joseph Angel, Fenton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 97 days.

(21) Appl. No.: 10/324,043

(22) Filed: Dec. 20, 2002

(65) Prior Publication Data

US 2004/0119275 A1 Jun. 24, 2004

(51) Int. Cl.[7] ............................................. B62D 1/184
(52) U.S. Cl. ........................................ 280/775; 74/493
(58) Field of Search ............................ 280/775; 74/775, 74/493; B62D 1/181, 1/184, 1/187, 1/189

(56) References Cited

U.S. PATENT DOCUMENTS 4,934,737 A * 6/1990 Nakatsuka .................. 280/775
4,967,618 A * 11/1990 Matsumoto et al. .......... 74/493
5,163,337 A * 11/1992 Herron et al. ................ 74/493
6,640,661 B2 * 11/2003 Duncan et al. ............... 74/493

* cited by examiner

Primary Examiner—Eric Culbreth
(74) Attorney, Agent, or Firm—Ralph E. Smith

(57) ABSTRACT

A tilt setting device for a steering column includes a rod and a sleeve, with the rod being telescopically disposed in a hollow center of the sleeve. The rod is pivotably coupled to one of the steering column's main column and tilt head. The sleeve includes a lateral extending elongated hole through which a pin, fixed to the other of the main column and the tilt head, extends so that the sleeve is able to pivot about the pin relative to the other of tie main column and the tilt head. The elongated hole also allows the sleeve to rotate about its axis relative to the rod. The elongated hole includes a narrower end, a wider end, and sides extending between the narrower and wider ends. At least one of the sides includes a lateral, untapered region adjacent the narrower end.

11 Claims, 5 Drawing Sheets

TILT SETTING DEVICE FOR A STEERING COLUMN

FIELD OF THE INVENTION

The present invention relates to a tilt setting device for a steering column of a vehicle.

BACKGROUND AND SUMMARY OF THE INVENTION

A steering column generally includes a main column, a tilt head, and a pivot joint, such as a universal joint, which pivotably connects the tilt head to the main column. A steering wheel is mounted on the tilt head. The pivot joint rotatably fixes the tilt head to the main column to allow the rotation of the steering wheel to be transmitted from the tilt head to the main column. However, the pivot joint allows the tilt head to pivot relative to the main column so that the driver can adjust the tilt angle in accordance with his preference.

The steering column also includes a tilt setting device which the driver can use to adjust the tilt angle of the tilt head and to set the tilt head at a desired tilt angle. The tilt setting device may have an elongated configuration with two ends. One end of the tilt setting device is connected to the main column, and the other end is connected to the tilt head. The length of the tilt setting device may be adjusted to adjust the tilt angle of the tilt head.

The tilt setting device may include a sleeve and a rod which is disposed telescopically in the hollow center of the sleeve. Each of the sleeve and rod has first and second ends. The second end of the rod extends into the hollow center of the sleeve from the first end side of the sleeve. The first end of the rod is preferably coupled pivotably to one of the main column and tilt head, and the second end of the sleeve is preferably coupled pivotably to the other of the main column and tilt head. Preferably, the rod is pivotably coupled to the one of the main column or tilt head with a pin that extends through a hole on the rod. Similarly, the sleeve may be pivotably coupled to the other of the main column or tilt head with a pin that extends through a hole on the sleeve. The pins may be fixed to the respective main column and tilt head. The length of the tilt setting device may be defined as the distance between the first end of the rod and the second end of the sleeve.

The length of the tilt setting device may be adjusted by sliding the rod relative to the sleeve telescopically, i.e., in the longitudinal direction. The length of the tilt setting device may be set by securing the rod to the sleeve in the longitudinal direction to prevent relative longitudinal movement between the sleeve and the rod.

To secure the rod to the sleeve, the hollow center of the sleeve may have an inner surface that has length-wise opposite surfaces and width-wise opposite surfaces, wherein the length-wise surfaces may be spaced farther apart than the width-wise surfaces. Preferably, the width-wise opposite surfaces are threaded, and the length-wise opposite surfaces are unthreaded. Additionally, the outer surface of the rod may also have length-wise opposite surfaces and width-wise opposite surfaces, wherein the length-wise opposite surfaces are threaded, and the width-wise opposite surfaces are unthreaded.

Preferably, the hollow center of the sleeve and the rod are dimensioned so that when the threaded width-wise surfaces of the sleeve's hollow center face the threaded length-wise surfaces of the rod, the inner threads of the hollow center engage the outer threads of the rod to prevent the rod from sliding relative to the sleeve telescopically. On the other hand, when the threaded width-wise surfaces of the sleeve's hollow center face the unthreaded width-wise surfaces of the rod, the inner threads of the hollow center disengage the outer threads of the rod to allow the rod to slide relative to the sleeve telescopically.

With this arrangement, the locking and unlocking of the rod with the sleeve can be accomplished by rotating the sleeve relative to the rod or by rotating the rod relative to the sleeve. When the rod and sleeve are pivotably coupled to the respective main column and tilt head, in order for the rod or sleeve to rotate, the hole on the rod or sleeve, through which the pin extends to pivotably couple the rod or sleeve to the respective main column or tilt head, may have an elongated configuration and may extend laterally, i.e. may extend in a direction perpendicular to the longitudinal direction of the rod and sleeve. As the rod or sleeve rotates, the pin slides in the laterally extending, elongated hole.

Normally, the rod is locked with the sleeve to set the tilt head at a desired angle, and the pin is located at a first end of the elongated hole. In order to unlock the rod with the sleeve to adjust the tilt angle, the rod or sleeve is rotated, and the pin moves from the first end of the elongated hole to the second end. In order to facilitate the movement of the pin from the first end of the elongated hole to the second end, the elongated hole may be tapered with the second end wider than the first end, i.e. at least one side of the elongated hole is tapered.

The tilt setting device may include a spring that biases the rod or sleeve towards the locked position with the pin located at the narrower end of the elongated hole. To reset the tilt angle, the rod or sleeve is rotated to the unlocked position against the spring torque with the pin moving from the narrower end of the elongated hole to the wider end. After the tilt angle has been reset, the rod or sleeve is released to allow it to return to the locked position under the spring torque.

Applicant has recognized a problem associated with prior art tilt setting devices. The problem is that, when any force is applied to the tilt setting device in the longitudinal direction, the tapered side(s) of the elongated hole tends to push the pin towards the wider end of the elongated hole and to rotate the rod and sleeve in the unlocked direction. This may accidentally unlock the tilt setting device when the rod and sleeve are in the unlocked position.

In the present invention, to prevent this from happening, at least one of the sides of the elongated hole may be untapered near the narrower end of the elongated hole. The untapered region may be generally defined as a region that does not have an increased width in the direction of the wider end of the elongated hole. Preferably, the untapered region is a flat region. When the pin is at the narrower end of the elongated hole, the pin is in, or rests against, the untapered region. Consequently, when the rod or sleeve is at the locked position (i.e. when the pin is at the narrower end of the elongated hole), longitudinal forces applied to the tilt setting device can no longer cause the pin to move towards the wider end of the elongated hole and cause the rod and sleeve to rotate in the unlocked direction.

As defined herein, the words "length-wise" and "width-wise" do not imply that the cross sections of the rod and sleeve's hollow center have a rectangular configuration or even an oblong configuration. In certain cases, they simply mean that the rod or sleeve's hollow center has two opposite surfaces (length-wise surfaces) that are farther apart that two other opposite surfaces (width-wise surfaces). For example, the sleeve and rod may each have an elliptical cross-section. The length-wise opposite surfaces may be the surfaces at the opposite ends of the major axis of the ellipse, and the width-wise opposite surfaces may be the surfaces at the opposite ends of the minor axis.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
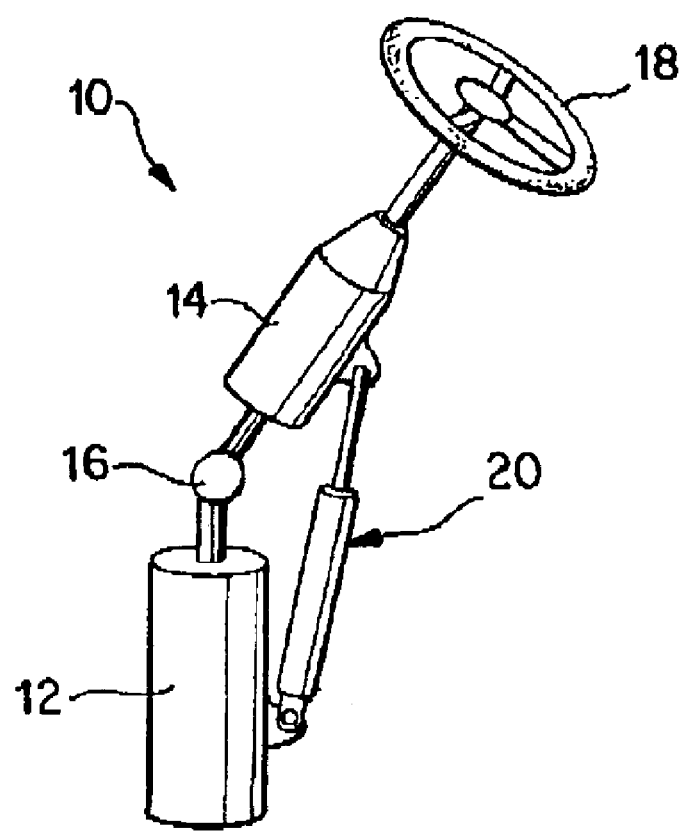
FIG. 1 is a schematic representation of a vehicle steering column.

FIG. 1 illustrates a steering column 10 for a motor vehicle. The steering column 10 may include a main column 12, a tilt head 14, and a pivot joint 16, which pivotably connects the tilt head 14 to the main column 12. A steering wheel 18 is mounted on the tilt head 14. The pivot joint 16 rotatably fixes the tilt head 14 to the main column 12 to allow the rotation of the steering wheel 18 to be transmitted from the tilt head 14 to the main column 12. However, the pivot joint 16 allows the tilt head 14 to pivot relative to the main column 12.

As shown in FIG. 1, the steering column 10 also includes a tilt setting device 20 which the driver can use to adjust the tilt angle of the tilt head 14 and to set the tilt head 14 at a desired tilt angle. The tilt setting device 20 may have an elongated configuration with two ends. In the illustrated embodiment, one end of the tilt setting device 20 is connected to the main column 12, and the other end is connected to the tilt head 14. The length of the tilt setting device 20 may be adjusted to adjust the tilt angle of the tilt head 14.

Figure 2:
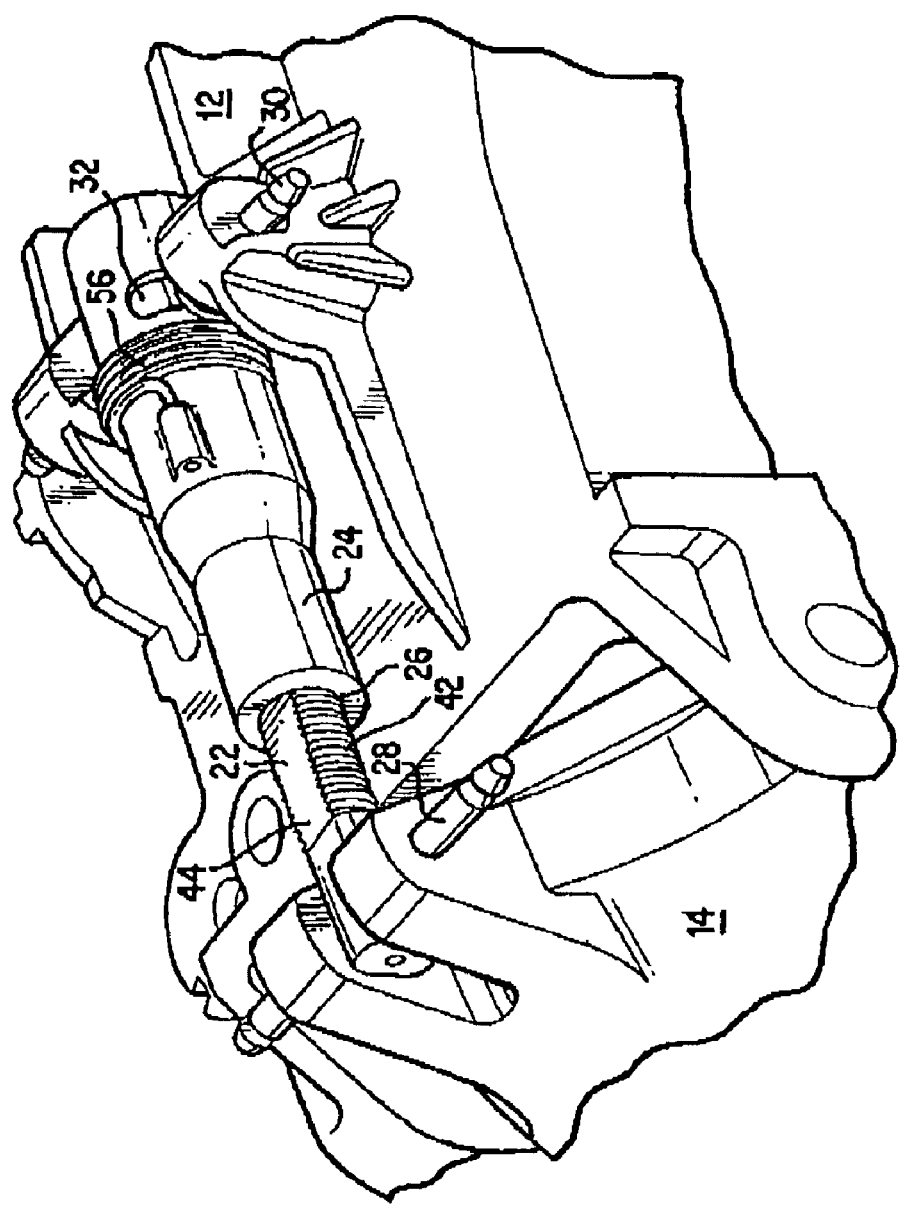
FIG. 2 is a perspective view of a tilt setting device as installed in a steering column.

As shown in FIG. 2, the tilt setting device 20 preferably includes a rod 22 pivotably coupled to the tilt head 14, and a sleeve 24 pivotably coupled to the main column 12. The rod 22 may be disposed telescopically in a hollow center 26 of the sleeve 24. Preferably, the rod 22 is pivotably coupled to the tilt head 14 with a pin 28 that extends through a hole on the rod 22. Similarly, the sleeve 24 may be pivotably coupled to the main column 12 with a pin 30 that extends through a hole 32 on the sleeve 24.

Figure 3:
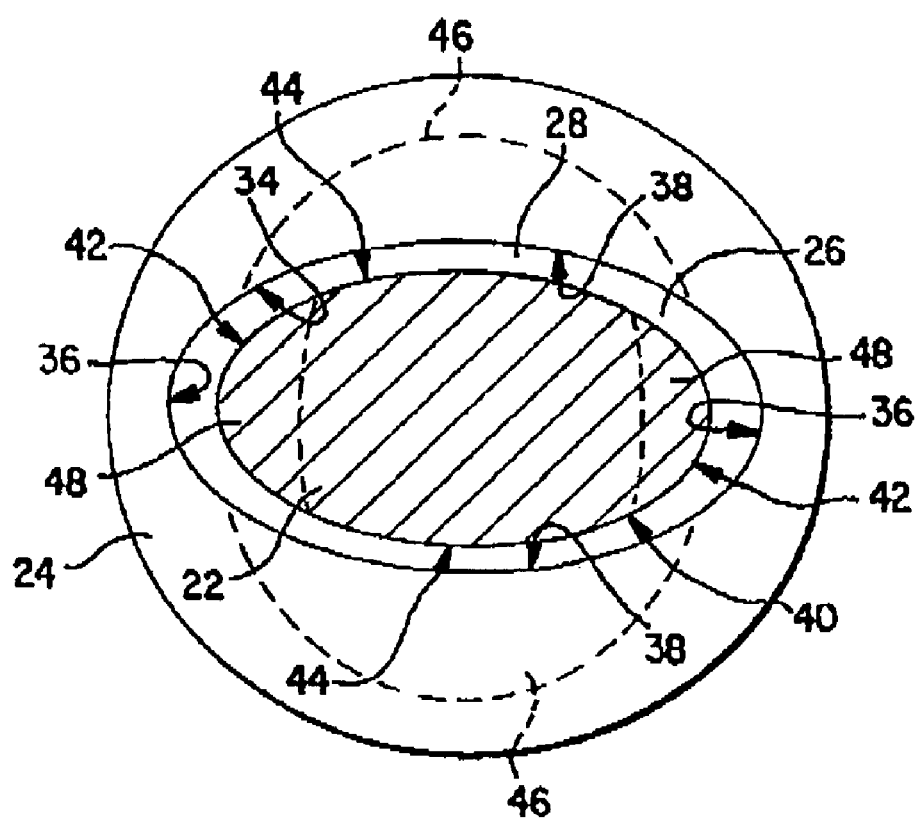
FIG. 3 shows that the inner threads of the sleeve's hollow center is disengaged with the outer threads of the rod to allow the rod to slide relative to the sleeve telescopically.

The length of the tilt setting device 20 may be adjusted by sliding the rod 22 relative to the sleeve 24 telescopically. For securing the rod 22 to the sleeve 24 to set the length of the tilt setting device 20, as shown in FIG. 3, the hollow center 26 of the sleeve 24 may have an inner surface 34 that has length-wise opposite surfaces 36 and width-wise opposite surfaces 38, wherein the length-wise surfaces 36 may be spaced farther apart than the width-wise surfaces 38. Preferably, as shown in FIG. 3, the width-wise opposite surfaces 38 of the sleeve's hollow center 26 are threaded, and the length-wise opposite surfaces 38 are unthreaded. FIG. 3 also shows that the outer surface 40 of the rod 22 also has length-wise opposite surfaces 42 and width-wise opposite surfaces 44, wherein the length-wise opposite surfaces 42 are threaded, and the width-wise opposite surfaces 44 are unthreaded.

Figure 4:
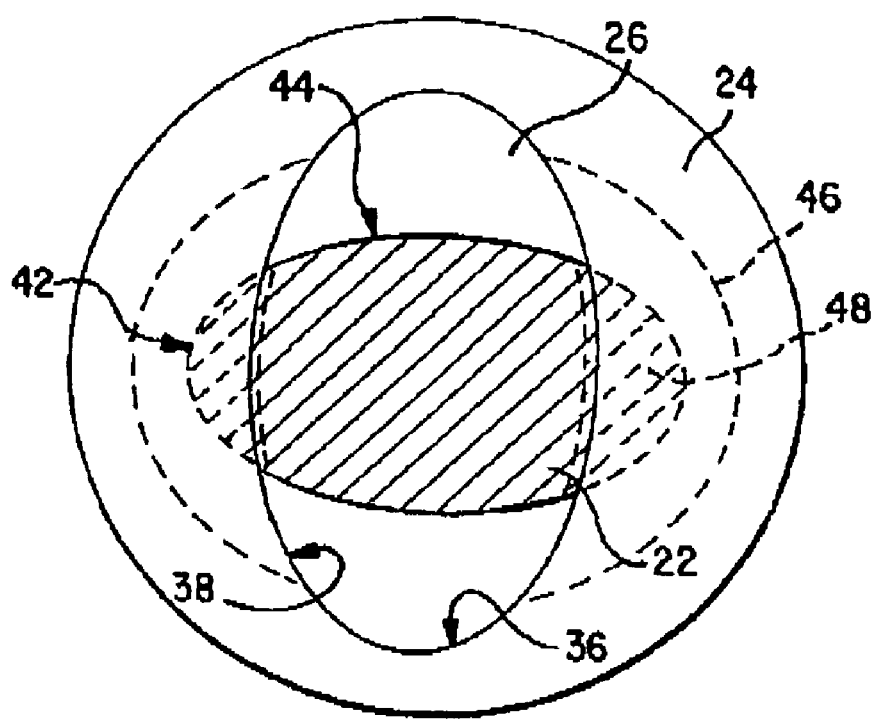
FIG. 4 shows that the inner threads of the sleeve's hollow center is engaged with the outer threads of the rod to prevent the rod from sliding relative to the sleeve telescopically.

Preferably, as shown in FIG. 4, the hollow center 26 of the sleeve 24 and the rod 22 are dimensioned so that when the threaded width-wise surfaces 38 of the sleeve's hollow center 26 face the threaded length-wise surfaces 42 of the rod 22, the inner threads 46 of the hollow center 26 engage the outer threads 48 of the rod 22 to prevent the rod 22 from sliding relative to the sleeve 24 telescopically. On the other hand, when the threaded width-wise surfaces 38 of the sleeve's hollow center 26 face the unthreaded width-wise surfaces 44 of the rod 22, as shown in FIG. 3, the inner threads 46 of the hollow center 26 disengage the outer threads 48 of the rod 22 to allow the rod 22 to slide relative to the sleeve 24 telescopically.

Figure 5:
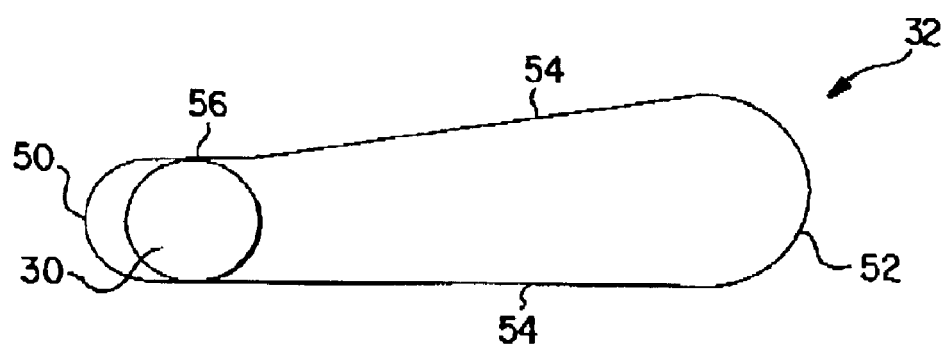
FIG. 5 shows the elongated hole on the sleeve.

With this arrangement, the locking and unlocking of the rod 22 with the sleeve 24 can be accomplished by rotating the sleeve 24 relative to the rod 22. When the sleeve 24 is pivotably coupled to the main column 12, in order for the sleeve 24 to rotate, the hole 32 on the sleeve 24 may have an elongated configuration, as shown in FIG. 5, and may extend laterally, i.e. may extend in a direction perpendicular to the longitudinal direction of the sleeve 24. The elongated hole 32 allows the pin 30 to slide in it and the sleeve 24 to rotate.

The elongated hole 32 has a narrower end 50, a wider end 52 and sides 54 extending between the narrower and wider ends 50, 52. At least one of the sides 54 of the elongated hole 32 may be tapered and may include an untapered region 56, preferably a flat region, adjacent the narrower end 50. When the pin 30 is in the untapered region 56 at the narrower end 50 of the elongated hole 32, the threads 48 of the rod 22 are engaged with the threads 46 of the sleeve's hollow center 26 to prevent relative longitudinal movement between the sleeve 24 and the rod 22. When the pin 30 is at the wider end 52 of the elongated hole 32, the threads 48 of the rod 22 are disengaged with the threads 46 of the sleeve's hollow center 26 to allow relative longitudinal movement between the sleeve 24 and the rod 22. In order to unlock the rod 22 from the sleeve 24 to adjust the tilt angle, the sleeve 24 is rotated, and the pin 30 moves from the narrower end 50 of the elongated hole 32 to the wider end 52.

The tilt setting device 20 may include a spring 56 that biases the sleeve 24 towards the locked position with the pin 32 located in the untapered region 56 at the narrower end 50 of the elongated hole 32. To reset the tilt angle, the sleeve 24 is rotated to the unlocked position against the spring torque with the pin 32 moving from the narrower end 50 of the elongated hole 32 to the wider end 52. After the tilt angle has been reset, the sleeve 24 is released to allow it to return to the locked position under the spring torque.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tilt setting device for a steering column including a main column, a tilt head, and a pivot joint connecting the tilt head to the main column, the device comprising:

a rod pivotably coupled to one of the main column and the tilt head; and a sleeve, the rod being disposed in a hollow center of the sleeve telescopically, the sleeve including, a lateral extending elongated hole, through which a pin, fixed to the other of the main column and the tilt head, extends so that the sleeve is able to pivot about the pin relative to the other of the main column and the tilt head, the elongated hole also allowing the sleeve to rotate about its axis relative to the rod, the elongated hole including a narrower end, a wider end, and sides extending between the narrower and wider ends, at least one of the sides being tapered and including a lateral, untapered region adjacent the narrower end.

2. The tilt setting device of claim 1, wherein the at least one side of the elongated hole has a tapered region disposed between the lateral, untapered region and the wider end.

3. The tilt setting device of claim 2, wherein the elongated hole is a first hole, and the tilt setting device further comprising a second hole identical to the first hole, wherein the pin extends through the first and second holes.

4. The tilt setting device of claim 2, wherein the untapered region is a flat region.

5. The tilt setting device of claim 1, wherein the elongated hole is a first hole, and the tilt setting device further comprising a second hole identical to the first hole, wherein the pin extends through the first and second holes.

6. The tilt setting device of claim 1, further comprising a spring rotatably biasing the sleeve so that the spring force pushes the narrower end of the elongated hole towards the pin, wherein the pin is in the untapered region when the pin is at the narrower end.

7. The tilt setting device of claim 1, wherein the hollow center of the sleeve has an inner surface that has length-wise opposite surfaces and width-wise opposite surfaces, the length-wise opposite surfaces being unthreaded, and the width-wise opposite surfaces being threaded, and wherein the outer surface of the rod also has length-wise opposite surfaces and width-wise opposite surfaces, the length-wise opposite surfaces being threaded, and the width-wise opposite surfaces being unthreaded.

8. The tilt setting device of claim 7, wherein when the pin is in the untapered region at the narrower end of the hole, the threaded regions of the rod are engaged with the threaded regions of the sleeve's hollow center to prevent relative longitudinal movement between the sleeve and the rod.

9. The tilt setting device of claim 8, wherein when the pin is at the wider end of the hole, the threaded regions of the rod are disengaged with the threaded regions of the sleeve's hollow center to allow relative longitudinal movement between the sleeve and the rod.

10. The tilt setting device of claim 7, wherein when the pin is at the wider end of the hole, the threaded regions of the rod are disengaged with the threaded regions of the sleeve's hollow center to allow relative longitudinal movement between the sleeve and the rod.

11. The tilt setting device of claim 1, wherein the untapered region is a flat region.

* * * * *